United States Patent [19]

Swander, Jr.

[11] 3,730,056
[45] May 1, 1973

[54] DOUBLE DIAPHRAGM BRAKE OPERATOR IMPROVEMENTS

[75] Inventor: Kenneth D. Swander, Jr., Prairie Village, Kans.

[73] Assignee: Certain-Teed Saint Gobain Insulation Corporation, Valley Forge, Pa.

[22] Filed: June 14, 1971

[21] Appl. No.: 148,942

[52] U.S. Cl. .............................. 92/48, 92/63, 92/64
[51] Int. Cl. ................................................ F01b 19/00
[58] Field of Search ......................... 92/48, 49, 63, 97

[56] References Cited

UNITED STATES PATENTS

| | | | |
|---|---|---|---|
| 2,649,169 | 8/1953 | Holman, Jr. | 188/360 |
| 3,011,832 | 12/1961 | Euga | 303/54 |
| 3,064,685 | 11/1962 | Washnock et al. | 92/50 |
| 3,182,566 | 5/1965 | Berg et al. | 92/24 |
| 3,228,729 | 1/1966 | Schubert | 303/89 X |
| 3,240,129 | 3/1966 | Cruse | 92/63 X |
| 3,267,819 | 8/1966 | Valentine et al. | 92/24 |
| 3,282,169 | 11/1966 | Leighton | 92/24 |
| 3,453,030 | 7/1969 | Cumming | 92/24 X |
| 3,508,470 | 4/1970 | Swander, Jr. et al. | 92/130 X |
| 3,515,438 | 6/1970 | Stevenson et al. | 92/63 X |

*Primary Examiner*—Martin P. Schwadron
*Assistant Examiner*—A. Hershkovitz
*Attorney*—Thomas M. Scofield

[57] ABSTRACT

An improved air brake diaphragm chamber, having two diaphragms placed close to each other therewithin and held in position inside the chamber by a clamp band, the outer or outboard (with respect to the axle or brake) one of said diaphragms having a separate air pressure input on the outer shell of the chamber, a perforated ring spacing said two diaphragms with an air inlet connected to said perforation for feeding air between said diaphragms and means for effectively sealing the peripheral zones of said diaphragms with respect to said ring and clamp band, particularly including means preventing extrusion of the diaphragms at the connection points of the clamp band halves.

The combination of the air brake diaphragm chamber with two diaphragms and the air feed means therebetween with, as a first option, an outboard spring brake unit of minimum size and, as a second option, an inboard spring brake power unit, in all cases access readily provided to both the power spring unit and the diaphragm chamber.

An improved air brake diaphragm chamber, having two diaphragms placed close to each other therewithin and held in position inside the chamber by a clamp band, the outer or outboard (with respect to the axle or brake) one of said diaphragms having a separate air pressure input on the outer shell of the chamber, the inboard one of said diaphragms having a central opening or perforation therethrough, the brake actuating rod in operative connection with said diaphragm and connected thereto, said brake operating rod hollow whereby fluid pressure may be input between said diaphragm through said brake operating rod, and means for effectively sealing the peripheral zones of said diaphragms with respect to said clamp band, particularly including means preventing extrusion of the diaphragms at the connection points of the clamp bands halves.

An improved air brake diaphragm chamber, having a single diaphragm therewithin held in position inside the chamber by a clamp band, and means for effectively sealing the peripheral zones of said diaphragm with respect to said clamp band, particularly including means preventing extrusion of the diaphragm at the connection points of the clamp band halves.

9 Claims, 14 Drawing Figures

INVENTOR.
Kenneth D. Swander Jr.
ATTORNEYS

INVENTOR.
Kenneth D. Swander Jr.

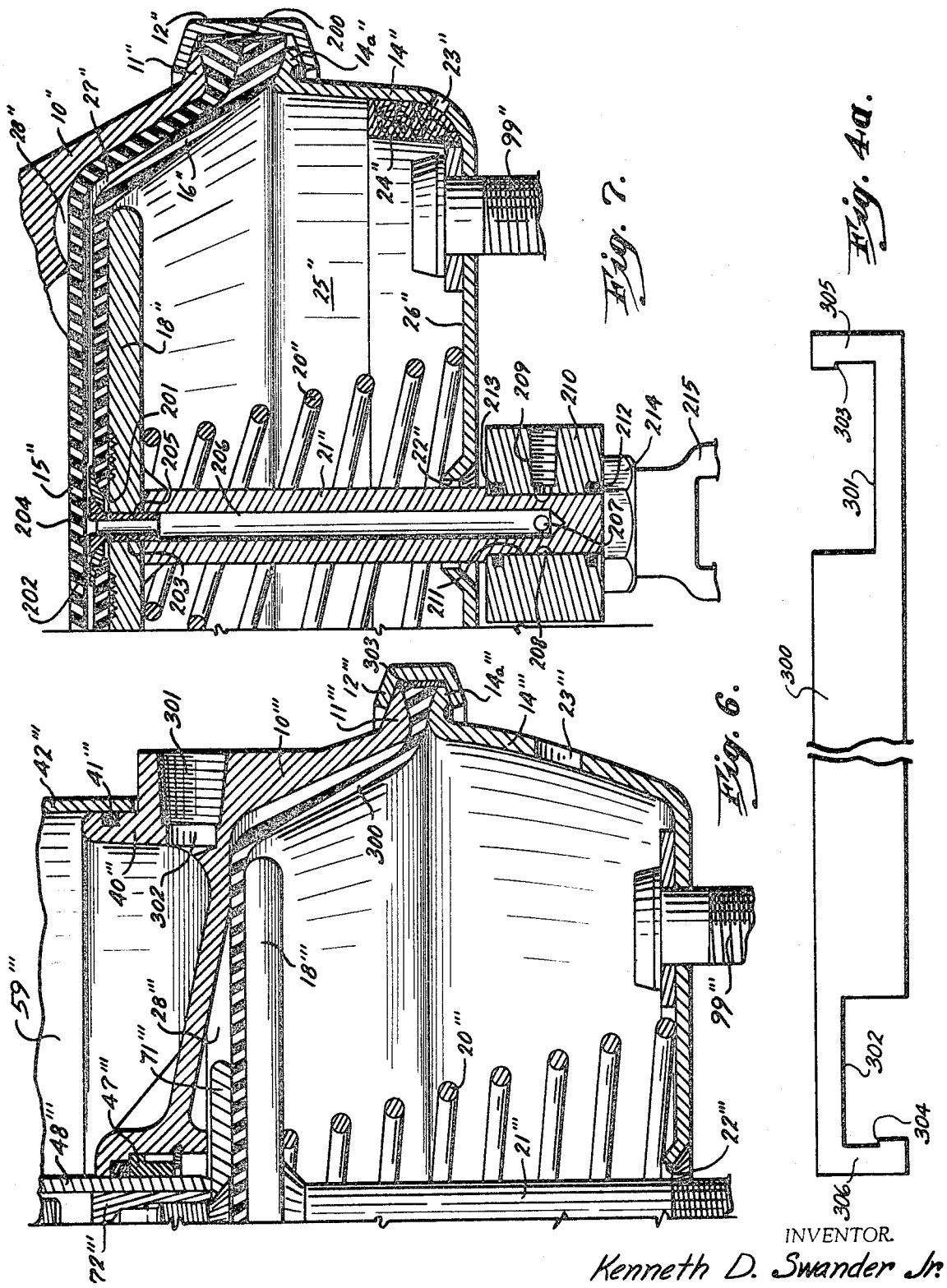

INVENTOR
Kenneth D. Swander Jr.
BY
Scofield, Kotger, Scofield + Lowe
ATTORNEYS

Patented May 1, 1973

INVENTOR
Kenneth D. Swander Jr.

BY
ATTORNEYS

DOUBLE DIAPHRAGM BRAKE OPERATOR IMPROVEMENTS

THE PRIOR ART

The prior art has typically shown numerous examples of brake chambers utilizing a plurality of chamber diaphragms. Typically, these involve the two enclosing sections of the chamber, disc-like or arcuate in cross-section (for truncated cone), with the two diaphragms retained peripherally at their edges between the two halves and an intermediate central ring member therebetween, with fastening means provided to couple the two chamber halves and the intermediate ring into a single sealed assembly. An air pressure inlet is provided into the outboard disc of the chamber and the second air inlet into the ring member between the two diaphragms. A push rod connecting to a brake or the work is attached to or abutted against the diaphragm which is adjacent the side of the chamber not penetrated by the outboard air inlet means.

Thus, see Holman, Jr., U.S. Pat. No. 2,649,169, issued 8-18-53; Horn, 2,770,799, issued Nov. 13, 1956; Euga, U.S. Pat. No. 3,011,832, issued Dec. 5, 1961; Washnock et al, U.S. Pat. No 3,064,685, issued Nov. 20, 1962.

There are additionally known devices of the sort immediately described with incorporate, in addition, mechanical locking means to hold in abeyance a provided spring function. Examples of these are seen in Berg et al, U.S. Pat. No. 3,182,566, issued May 11, 1965; Leighton, U.S. Pat. No. 3,282,169, 169, issued Nov. 1, 1966; Valentine et al, U.S. Pat. No. 3,267,819, issued Aug. 23, 1966, and Cumming, U.S. Pat. No. 3,453,030, issued July 1, 1969.

Analogous to the first described type above, but providing a locking means for retaining the brake in applied position, in Schubert, U.S. Pat. No. 3,228,729, issued Jan. 11, 1966.

DESCRIPTION OF THE INVENTION

The conventional mode of operation of a double diaphragm brake chamber is as follows. In a normal brake application, air is delivered between the two diaphragms, forcing the inward diaphragm (inboard) toward the brake and the outboard or outward diaphragm outwardly (maintaining its stationary position), thus applying the brakes through a push rod inboard of and driven by the inboard diaphragm. In a secondary brake application, or if the inboard diaphragm fails, air is delivered to the space between the outboard diaphragm and the brake chamber outer wall, thus forcing the outboard diaphragm inwardly to apply the brakes.

In the brake chamber construction shown in FIGS. 1, 5 and 7, with respect to the spring device associated with the double diaphragm chamber, there is additionally provided a third circuit. This circuit feeds air into the space between the power piston and the inboard wall of the spring chamber whereby to normally keep the spring backed off.

THE DRAWINGS

Figure 1:
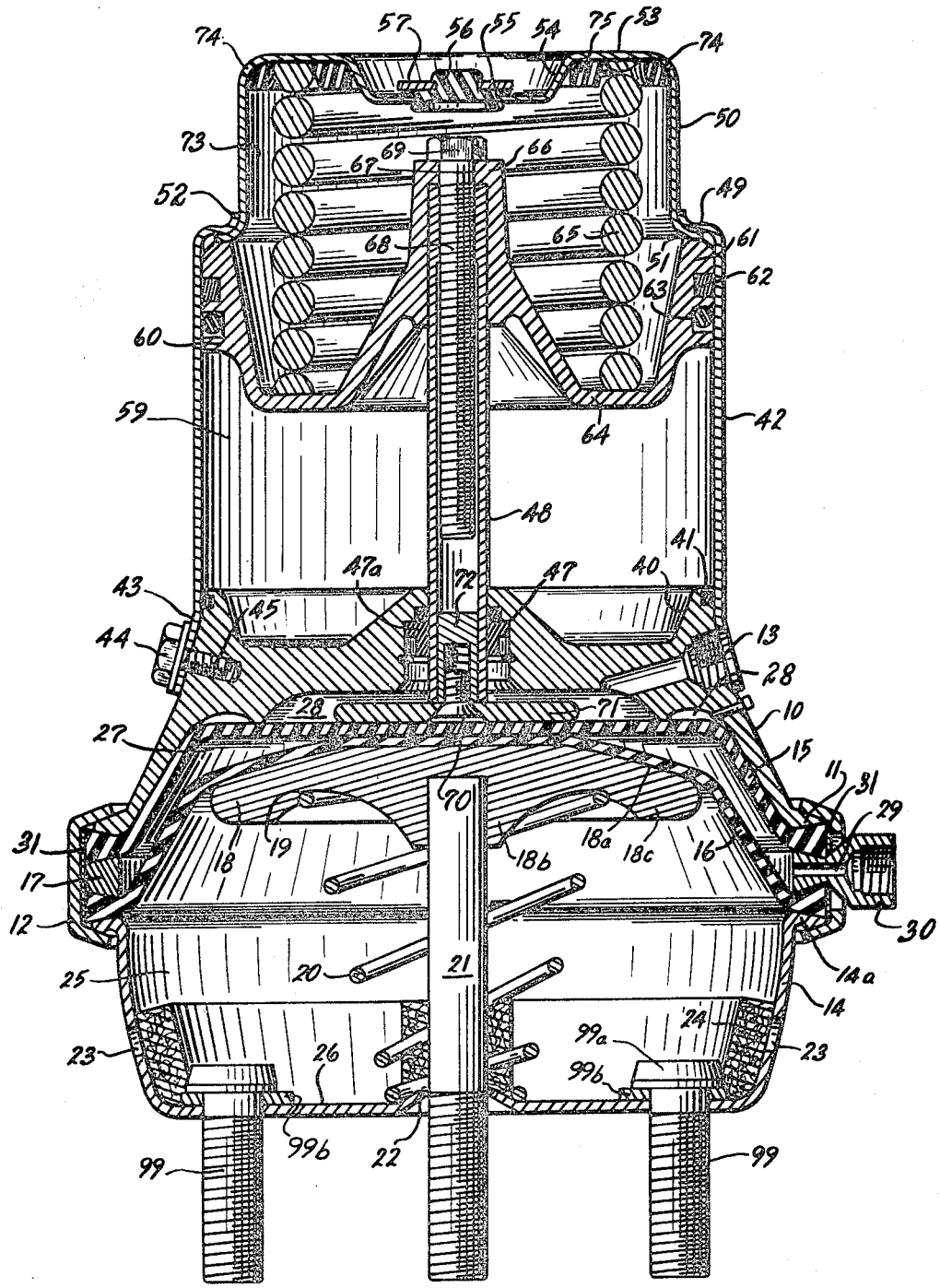
FIG. 1 is a sectional view through a combined air brake chamber and spring brake chamber, the former utilizing a double diaphragm arrangement in the chamber, the latter positioned outboard of the chamber and taken along the lines 1—1 of FIG. 2 in the direction of the arrows.
Figure 3:
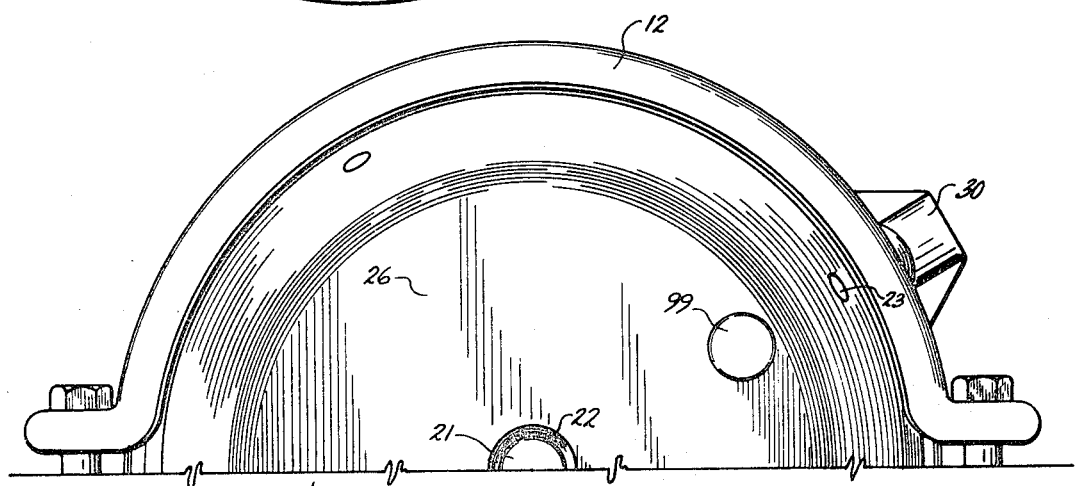

FIG. 3 is a fragmentary section showing essentially the lower righthand side of FIG. 1 including the double diaphragm unit (service) utilizing a spacer between the two diaphragms which couples with a functional configuration of the outboard chamber inner wall in a manner to be described; also notable is that the section is rotated about fifteen (15°) degrees from that of the lower righthand portion of FIG. 1 so that the air feed between the diaphragms is visible.

FIG. 4A is a fragmentary view of the portion of the diaphragm retainer ring outboard of the paired diaphragms and spacing ring therebetween (FIGS. 1 and 5) which permits the passage of the air input therebetween (this is a preferred form).

Figure 4B:
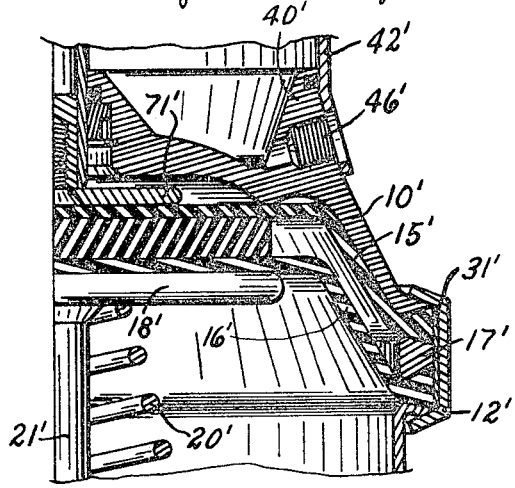

FIG. 4B is a sectional view of a combined service and spring brake unit, the chamber positioned inboard of the spring unit and involving the improved double diaphragm chamber construction and function.

Figure 5:
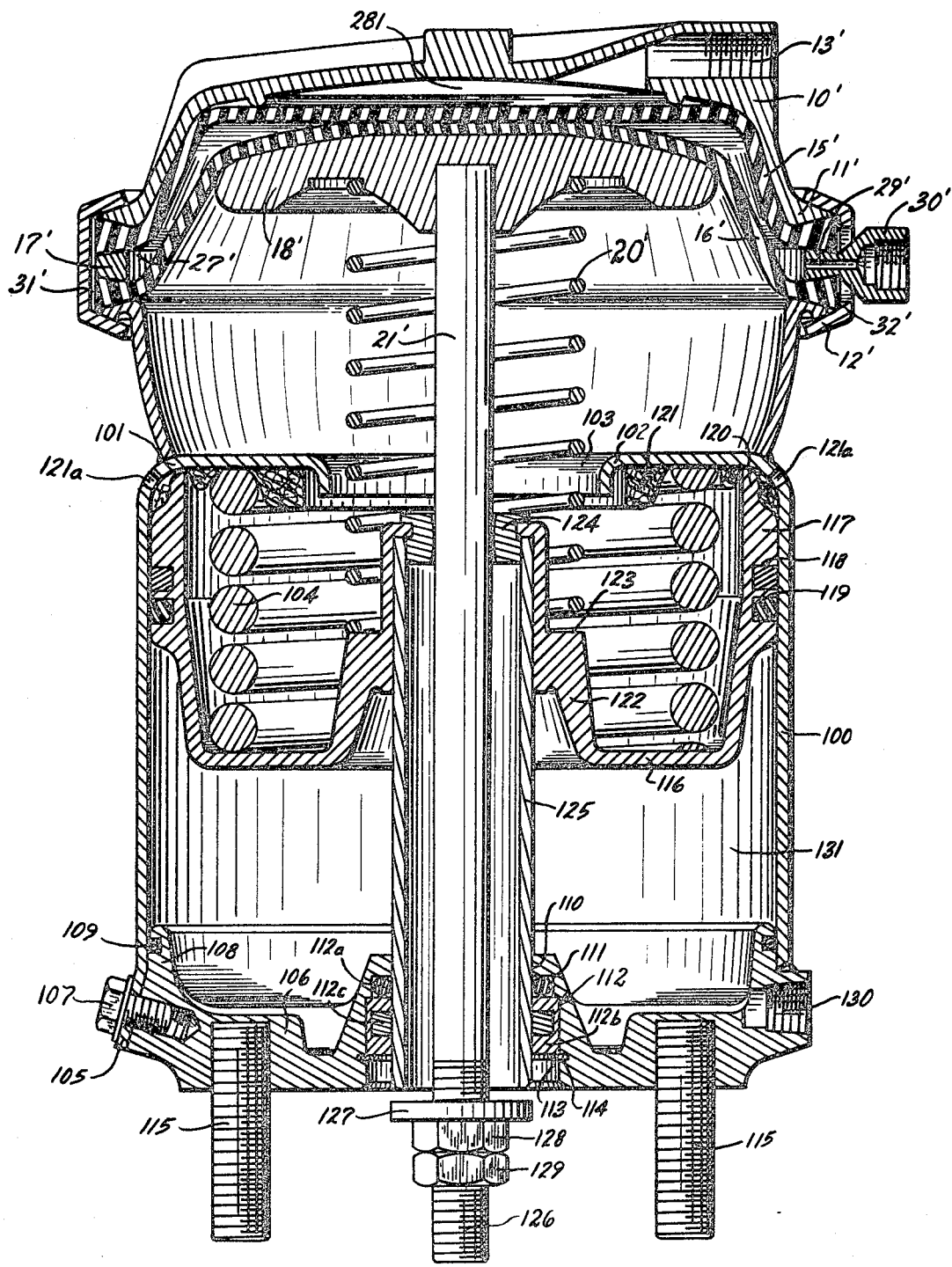

FIG. 5 is a sectional view through a combined brake chamber and spring chamber, the former utilizing a double diaphragm arrangement in the brake chamber, the later positioned inboard of the brake chamber.

FIG. 6 is a fragmentary sectional view through a brake chamber at the diaphragm-clamp band intermediate portion thereof utilizing the inventive diaphragm retaining ring in a single diaphragm application. (spring chamber outboard of the chamber.)

FIG. 7 is a fragmentary sectional view through a brake chamber at the diaphragm-clamp band intermediate portion thereof utilizing the inventive diaphragm retaining ring in a double diaphragm application (spring chamber outboard of the service brake chamber).

Figures 8, 9:
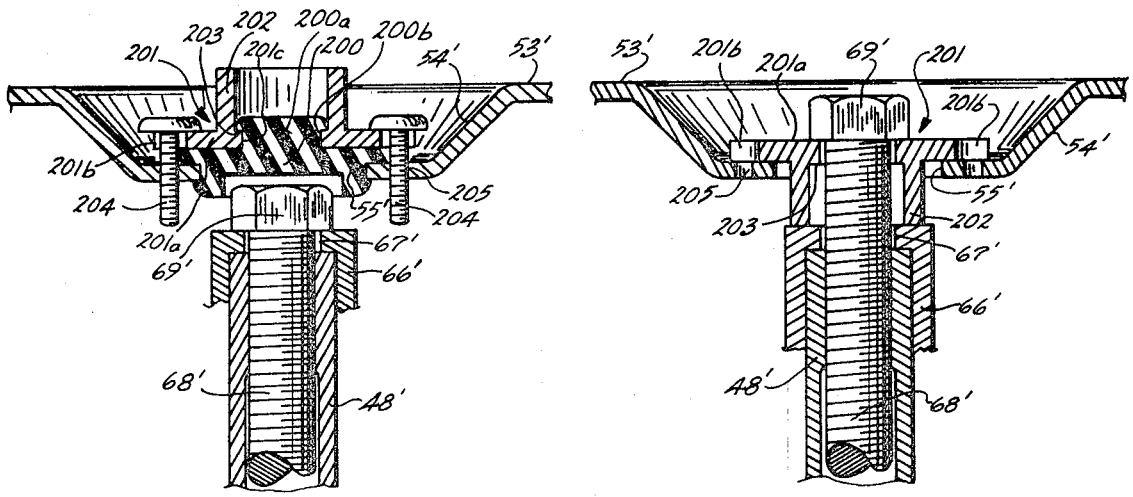

FIG. 8 is a side, sectional, fragmentary view of a modified construction adapted to be inserted in the uppermost central portion of the add-on unit of FIG. 1. The improvement is a device to be used in the mechanical release of the power spring of the device of FIG. 1, the improvement shown in stored position, not in use in FIG. 8.

FIG. 9 is a view like that of FIG. 8, but with the improvement for use in mechanical release of the power spring of the device of FIG. 1 in operating position or in use.

Figure 10:
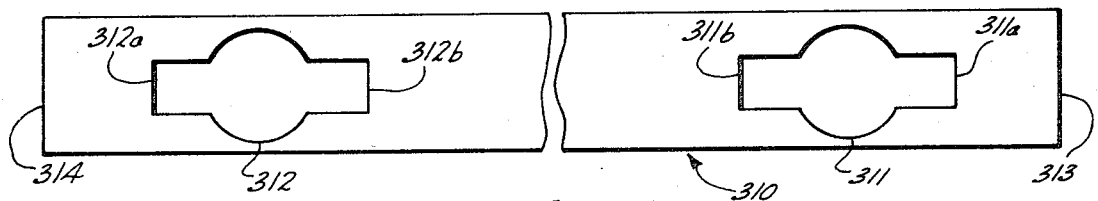

FIG. 10 is a view of a modified form of elongate band usable as a ring inside the clamp band in the structures of, particularly, FIGS. 1 and 5.

Figure 11:
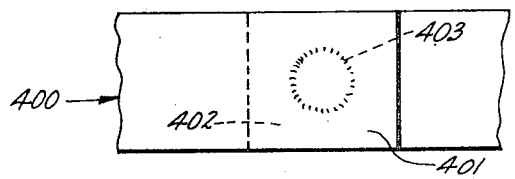

FIG. 11 is a fragmentary view of a ring adapted to be used in the construction of FIG. 6 and 7 within the clamp band to retain the diaphragm or diaphragms therewithin, the view showing the fastening of the ends of an elongate band to form a ring.

Figure 12:
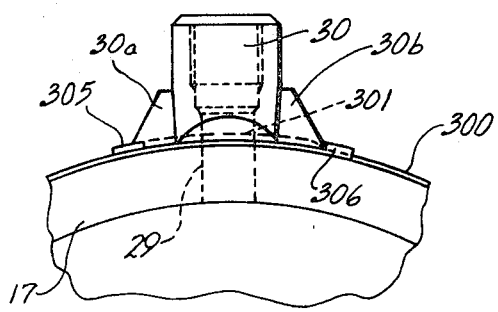

FIG. 12 is a fragmentary plan section of the diaphragm spacer seen in the upper portion of FIG. 5 and the lower portion of FIG. 1 with the detachable ring member of FIG. 4a in utilization therewith.

Figure 13:
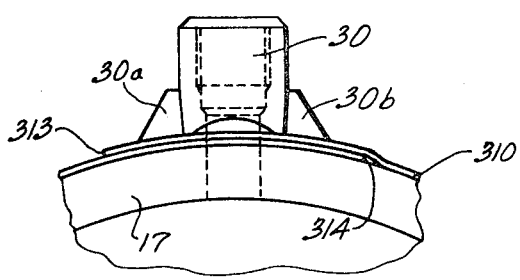

FIG. 13 is a view like that of FIG. 12, but showing the removable ring member of FIG. 10 associated with the diaphragm spacer.

OBJECTS OF THE INVENTION

An object of the invention is to improve dual circuit air brake systems, particularly those involving the use of a pair of diaphragms in the brake chamber.

Another object of the invention is to provide an improved air brake chamber (constructions of FIGS. 1, 5 and 7) where one always has an intact and working, or acting, secondary brake (at full effect) due to the assumption that "only a single failure will occur at one time and cumulative failures are not expected."

Another object of the invention is to provide an improved double diaphragm air brake chamber which is provided with a secondary and parking brake by virtue of combination therewith of a power spring unit, options being provided of the power spring unit being either outboard or inboard of the double diaphragm brake chamber.

Another object of the invention is to provide an improved brake chamber construction utilizing a pair of ordinary or standard diaphragms, wherein a clamp band may be employed, together with an air inlet carrying spacer ring between the diaphragms, further means being provided to effectively seal this combination of structure completely around the periphery thereof.

Another object of the invention is to provide means for sealing the outboard diaphragm of a pair of diaphragms in a chamber against the inside surface of the outer chamber during normal operation of the inboard diaphragm without additional structure applied to the outboard diaphragm (FIGS. 1, 4B, 5 and 7 modifications) so that, even if the outboard emergency diaphragm is ruptured, an effective seal is provided so air pressure is not lost in the brake chamber.

Another object of the invention is to provide peripheral sealing means to be employed at the juncture of the two halves of the brake chamber receiving a single diaphragm therebetween and utilizing a clamp band (joining the two halves of the chamber together and compressing the periphery of the diaphragm therebetween) said means continuously and effectively containing the diaphragm periphery within the clamp band and preventing extrusion thereof at the clamp band bolt or connection points.

Another object of the invention is to provide a combined double diaphragm chamber with a ring spacing the diaphragms and air input penetrating said ring whereby the chamber outer diameter is relatively greater than normal, yet with an add-on type power spring unit of very minimum outer diameter.

Another object of the invention is to provide a double diaphragm chamber with an outboard spring brake unit where the outboard wall of the chamber comprises the inboard wall of the spring chamber, the spring cylinder or housing being separately and readily removable both from the said inboard wall thereof and outboard wall of the chamber whereby to provide ready and separate access to both the piston of the spring chamber and the diaphragms of the chamber.

Another object of the invention is to provide a double diaphragm chamber in combination with a spring brake unit, the latter inboard of the chamber yet there being provided separate and ready access through and removability of both the inboard wall of the spring chamber and the outboard wall of the chamber.

Another object of the invention is to provide an improved brake chamber construction utilizing a pair of ordinary or standard diaphragms, wherein a clamp band may be employed therewith, means being provided to effectively seal both diaphragms within the clamp band completely around the periphery thereof, further means being provided to input air between the diaphragms via the brake operating rod inboard (toward the brake) of both diaphragms.

Another object of the invention is to provide a variety of band or ring diaphragm sealing means adapted to be employed within the clamp band of a brake chamber wherein the brake chamber may utilize various combinations (for various functional purposes) of diaphragms, namely, a single diaphragm, a pair of diaphragms, a pair of diaphragms having a ring spacer therebetween utilizing an air input through the said ring spacer, and the like; all of these band and ring sealing means effectively and continuously containing the diaphragm (or diaphragms) periphery (or peripheries) within the clamp band and effectively preventing extrusion thereof at the clamp band bolt or connection point (or points).

Another object of the invention is to provide ring and band sealing and guide means for brake chambers utilizing one or more diaphragms (for various functional purposes) in connection therewith, said means, in addition to its diaphragm sealing purposes, effectively guiding the various parts of the brake chamber in assembly, namely: the brake chamber half flanges, the diaphragm or diaphragms, and the spacing ring between the diaphragms (if same is employed). Further, said means strongly aid in keeping these parts concentric in assembly of said chamber.

Another object of the invention is to provide sealing and guide means usable with brake chambers employing one or more resilient diaphragms therewithin (for various functional purposes), which sealing and guide means strongly aids in providing a leak-free brake unit). Thus, for example, the assembler of a brake chamber must preload and squeeze the diaphragm or diaphragms to a certain radial loading for successful assembly. (If the diaphragm or diaphragms is (are) out of concentricity, one will not attain a leak-free unit.) The improved ring or band sealing and guide means disclosed herein aid strongly in attainment of concentricity, when used in assembly, and further operates to prevent "blow-in", that is, losing the seal at the periphery of the diaphragm with the latter pulling into the center of the chamber upon use.

A further object of the invention is to provide, with respect to a brake unit having an outboard chamber and an inboard spring chamber, an improved sealing means and systems for the spring chamber at the inboard (with respect to the vehicle axle) end thereof whereby a leak-free unit may be provided for a much longer time than heretofore, in a situation where the seal is preventing communication between a corrosive outside-unit atmosphere and a sealed inner zone of the unit which is periodically and cyclically pressurized and exhausted.

Yet a further object of the invention is to provide, in a combination brake unit (utilizing an inboard brake chamber having one or more diaphragms therewithin and an outboard spring chamber) means which provide a much improved diaphragm return spring installation resulting in far greater diaphragm return spring life and effectiveness providing all of (1) a standard stroke for the diaphragm return spring, (2) a spring which effectively takes up the space between multiple diaphragms, when same are present, and (3) a larger closed height provided for the diaphragm return spring, so that it is not necessary to put said spring into said solid spring heights with high spring counterloads. Furthermore, this construction and improvement provide the desired return spring strength in order to release the brake at conditions such as a 40° F. below zero external terperature.

Another object of the invention is to solve all of the immediately above described problems with respect to the diaphragm return spring utilized in a different form of combination brake unit construction, namely, that wherein the spring unit is inboard and the brake chamber is outboard of the said unit.

Another object of the invention is to provide an improved housing structure for a combined brake unit wherein a spring chamber is provided inboard of an outboard brake chamber, the improvement in the housing of the inboard spring chamber permitting an integral, annular power retainer spring member outboard of said spring chamber and an improved inboard wall of the spring chamber, the latter integrally applicable and removable to the spring housing, whereby to improve the sealing characteristics of the spring chamber both peripherally, at the connection of the end wall with the housing proper, and centrally, with respect to the passage of the power piston drive shaft through the said end wall.

Another object of the invention is to provide an improved means for mechanically releasing the power spring in an add-on type spring brake unit, namely, a device which prevents the operator rupturing the piston casting by backing off the power spring too far in the mechanical release operation.

Another object of the invention is to provide improved means within an air brake chamber utilizing at least two diaphragms therewithin which consistently provides means and methods of obtaining a warning signal in the case of rupture of one of the diaphragms.

Other and further objects of the invention will appear in the course of the following description thereof.

FIG. 1 CONSTRUCTION

Referring first to FIG. 1, at 10 is generally designated the outboard (bulkhead) pressure plate, or member of an air brake chamber. This outboard pressure plate, as will be described, also serves as the inboard wall for the spring unit, to be described. Member 10 has an inboard circumferential flange 11 adapted to be gripped by a clamp band 12. Outer cap 10 has air input opening 13, which is internally threaded for attachment of an air pressure fitting. (Inboard and outboard are with respect to the vehicle axle)

The inboard plate, member or portion 14 of the air brake chamber has an outboard peripheral flange 14a also received within the clamp band 12 in conjunction with flange 11, the peripheral edges of a pair of standard diaphragms 15 and 16 also being gripped in air sealing fashion circumferentially between the flanges 11 and 14a, spaced by a ring generally designated 17 to be later described and removably fixed by clamp band 12. Diaphragm 16 is the inboard or normally operating (in brake applications) diaphragm of the pair. Diaphragm 15 is the outboard and secondary diaphragm.

Inboard diaphragm 16 abuts, on its in board or inner face, a circular pad or plate 18 which has a spring retainer groove 19 circumferentially formed in the inboard face thereof. Plate 18 receives diaphragm return spring 20 thereagainst, the latter encircling a push rod 21 fixedly mounting plate 18. Rod 21 extends through an opening 22 in the inboard wall of inboard chamber plate 14, centrally thereof, whereby to pass out of the brake chamber toward the axle or braking member or means. Air exhaust openings 23, covered inboard by filter material 24, (so that dirt and moisture will be excluded from the unit), are provided spaced around the lower shell 14 of the brake chamber.

The brake chamber has basically three zones. These comprise the inboard zone or space 25 defined between the inboard face of the inboard diaphragm 16 and the inboard or inner wall 26 of chamber plate or member 14. Zone 25 breathes through openings 23 as the diaphragms or one of them, more toward and away from the inner face 26 of chamber member 14 in service (or secondary) applications of the brakes and releasings thereof. The second zone of the chamber is that space numbered 27 between diaphragms 15 and 16 and which is served by an air input (to be described) through spacer ring 17. The third zone of the air brake chamber is numbered 28 and comprises that space outboard of or above (in the view of FIG. 1) the outboard diaphragm 15.

Turning to the zone of the clamp band 12, flanges 11 and 14a, diaphragms 15 and 16 (the peripheries thereof) and spacer ring 17, the following is noted. An input passage 29 is provided through ring 17 connecting to an enlarged internally threaded air input connection means 30. There is further provided, outboard of all of spacer ring 17, diaphragm peripheries 15 and 16 and flanges 11 and 14a, a continuous circumferential sealing and guide band or ring 31. The width of the ring 31 is preferably greater than the space between the opposing outer faces of flanges 11 and 14a, whereby the peripheries of the diaphragms 15 and 16 are continuously maintained at a uniform radius and do not extrude under pressure at the clamp band bolt joints or connection points. Ring 31 preferably lies against the inner face of clamp band 12.

FIG. 4A shows a first and preferred option of the sealing and guide band or ring 31, in that Figure designated 300. This comprises an elongate, preferably metal such as copper or steel, but optionally plastic as, for example, molded nylon ring. Provided at each end of the band 300 is a notch 301 (or 302), the notches opposing one another, that is, opening out of opposite edges of the strip or band 300. The end portion of the notch is provided with an engaging flange or edge 303 (or 304). The length of such a band 300 must be such that the end portions or legs 305 and 306 of the band will overreach or go past the portion of the fitting 30 which is within the clamp band 12 to engage on each side thereof, from above and below. When the legs 305 and 306 are linked at each side of fitting 30 and band 300 is tightly and snugly engaged around the assembly of flanges 11 and 14a, diaphragm peripheries 15 and 16 and spacer 17, tightening down of the clamp band will cause the diaphragm peripheries to extrude against the inner face of the ring 300 and form a seal thereagainst. The depth of the notches 301 and 302 must be sufficient that the band is centered with respect to the fitting 30 and within the clamp band with respect to the respective diaphragms above and below the spacing ring 17 and the two flanges 11 and 14a.

The width of the band may be greater than its bottom-out width in the clamp band or the width of the space of the base of the clamp band, provided the band or strip 300 is thin enough to flex in cross section. One important purpose of the band is to guide the various parts in assembly: the chamber flanges, the paired diaphragms, the spacer ring and the clamp band. The problem of keeping the parts concentric in assembly is very important.

It is also very important to have a leak-free unit. The assembler must preload and squeeze the diaphragms to a certain radial loading. If one or both of the diaphragms is out of concentricity, the assembler will not attain this, namely, a leak-free unit. The employment of the band 300, or its equivalent, also aids in preventing "blow-in", that is, losing the seal at the peripheries of the diaphragms with one or both of them pulling into the center of the chamber. When used in assembly of the brake chamber, it aids in providing a more uniform displacement of the diaphragm.

It is desired to have a wide band to guide the parts mentioned in assembly. If the band is wide, it then can be relatively thin. As mentioned, materials can be copper, steel, a molded nylon ring or the like. Hoop strength principles are involved of a banded element. Thus, this band must not elongate, it must have a low yield and a high modulus with respect to rubber. The element must have a low elongation in hoop strength.

The maximum width is the inner cavity width of the clamp band as closed down to the flanges. The minimum width feasible would be from one edge abutting against the inboard or outboard edge of the clamp band up to approximately one-half of the diaphragm away from the clamp band abutment. The more band present, the better backup is provided.

Referring to FIG. 10, therein is shown a modified form of elongate strip or band generally designated 310, but differing from the form seen in FIG. 4 in that two circular openings 311 and 312 are provided closely adjacent the ends 313 and 314 of the band 310. The openings have elongate slots 311a and b and 312a and b on each side thereof whereby to facilitate engagement with the fitting 30 of FIG. 1. The orifice size of the openings 311 and 312 must be sufficient to pass over the fitting 30 and the width of the slots 311a and b and 312a and b must closely fit the width of the portion of fitting 30 which attaches to spacer ring 17 within the clamp band 12. All other characteristics of this ring are the same as those of ring 300. Generally speaking, however, as may be seen, this band is usually of slightly greater length than ring 300. Band 300 also usually provides a tighter fit, which is preferable.

Referring now to FIG. 1 to the inboard side of the chamber and particularly the diaphragm return means, the following are noted. In the first place, washers or bolt receiving bases 99b are provided, whereby to space upwardly the relatively enlarged, relatively thick heads of attachment bolts 99 (heads 99a) from inboard wall 26. The circular pad or plate 18 which abuts the inboard diaphragm 16 is arcuately formed on its upper or outboard face thereof, 18a, whereby the central portion of diaphragm 16, when diaphragm return spring 20 has returned pad 18 to the position of FIG. 1, is markedly further outboard of wall 26 than the more peripheral portions of diaphragm 16 at the periphery of pad 18. There is further provided a spring retainer groove 19 circumferentially formed up into the underside or inboard face of pad 18. A boss 18b extends inboard whereby to receive and secure the outboard end of push rod 21. The diaphragm return spring 20 itself is of such structure, first, that its coils diverge outwardly outboard, and, secondly, the coils are so spaced that, when diaphragm pad 18 is in the opposite position to that of FIG. 1, namely, to the most inboard position, the spring coils are not in solid contact with one another.

The structure of this combination is that the outer inboard periphery 18c of pad 18 will contact the bolt heads 99a well before pad 18, in any portion thereof, approaches wall 26. This arcuate pad construction, the spring groove (circumferential) in the inboard face of the pad and the bolt heights all cooperate to permit the following. In the first place, the required standard stroke is achieved, namely, that stroke which is required by the service chamber from the position of FIG. 1 with diaphragm 16 (or 15), at the outboard confines of the chamber half 10 to the inboardmost position of the pad 18. This is also the stroke of the spring emergency chamber where pad 71 moves from the most outboard position shown in FIG. 1 to its most inboard position.

Referring to FIG. 1 and the space 25 below diaphragm 16, the diaphragm return spring 20 is working essentially in a nonsealed space with respect to the corrosive atmosphere under the truck. One expects the life of diaphragm 16 to last around a million cycles. It is a severe problem obtaining a diaphragm return spring that provides all of the desired functional features and yet can reach the same cycle life. By virtue of the three elements above recited, or the combination of structures shown, this is achievable. A larger closed height for the spring is provided so that the spring does not get into solid spring height with high spring counterloads. Return spring strength sufficient to deapply the brakes at 40° F. below zero may further be provided. All space within the inboard portion of the service chamber is effectively consumed.

(It must be remembered, in normal parking, that every times the vehicle engine goes off, the air pressure goes out of chamber 59 and power spring 65, acting as a parking brake, sets the brake through push rod 48, pad 71, diaphragm 16, pad 18 and push rod 21.)

FIG. 1 OPERATION (SERVICE)

Referring then, to the operation of the chamber of the brake in FIG. 1, in ordinary service applications of the brake, air is input through fitting 30 and passage 29 to the space 27 between diaphragms 15 and 16. This actuates push rod 21 downwardly in the view of FIG. 1 or toward the observer or inboard toward the brake. The action of this air pressure is two-fold. In the first place, it acts to maintain diaphragm 15 in the position shown in the view and, secondly, it drives diaphragm 16 inboard against the force of return spring 20 to extrude the push rod 21 through opening 22 and, through whatever linkage is employed, actuate the brakes. As the air pressure rises in the space 27 between the diaphragms, this relationship remains true, namely, diaphragm 15 in the position shown in FIG. 1 and diaphragm 16 working inwardly (and outwardly — as pressure falls) to actuate and release the brake to a greater or lesser degree as the vehicle operator applies and releases the brakes.

In the event of rupture or perforation of inboard diaphragm 16, or alternatively, in the event of an emergency application of the brakes, air pressure is input through opening 13 (via a conventional fitting attached to an air supply hose) (not shown) whereby to force the outboard diaphragm 15 downwardly in the view of FIG. 1 or toward the viewer or inboard to effect actuation of the brakes.

THE SPRING UNIT OUTBOARD OF THE SERVICE CHAMBER IN FIG. 1

Figure 2:
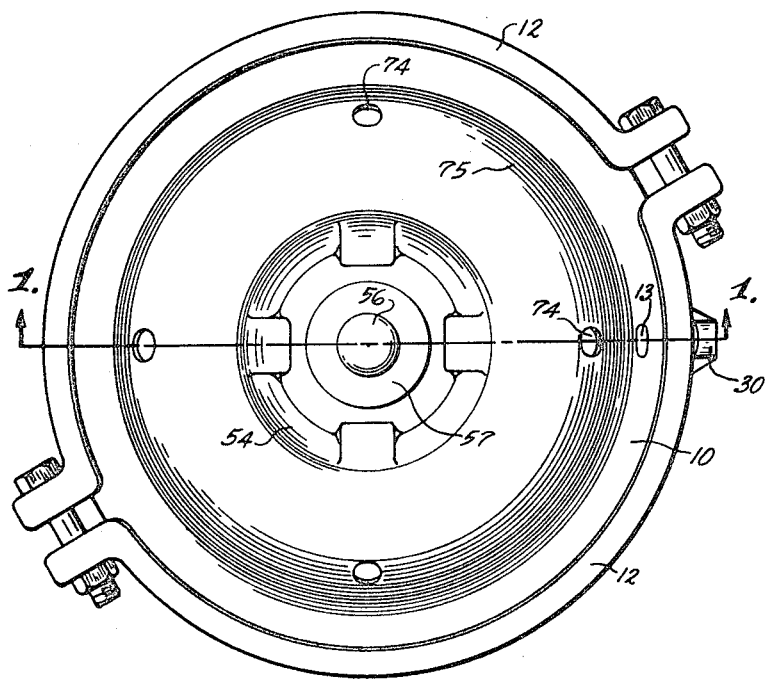
FIG. 2 is a partial view of the top of the device of FIG. 1 (in the view of FIG. 1 looking downwardly), showing the directions in which the drawing of FIG. 1 is taken.

Formed integral with or attached to the peripheral upper or outboard surface of the outer wall 10 of the brake chamber is a circumferential flange 40 having a circumferential groove 41 in the outer upper face thereof with sealing means of resilient character positioned therewithin. A cylindrical can or container 42 having an outwardly flared inward end 43 is fixedly connected to said flange 40 by means of suitable screws or bolts 44 received in internally threaded or tapped holes 45. The outward flanging of the cylindrical can 42 serves to make a sealed sliding fit, particularly with respect to the material in the groove 41. An air input passage 46 (see FIG. 2) (analogous to that in FIG. 4b) feeds air through the lower portion of flange 40. Centrally of outer wall 10 of the brake chamber there is provided an opening 47 having piston rod sealing means 47a removably received in the grooved side wall thereof. A hollow piston rod 48 passes in sliding sealing fashion through said opening 47. The outermost portion of can 42 is radially inwardly formed at substantial right angles as at 49 (circumferentially) to receive inboard thereof the outwardly flanged inward end 51 of upper spring housing or can 50. Upwardly flared portion 52 centrally of radially inwardly flanged portion 49 of cylinder portion 42 permits the inward and outward sliding of can portion 50 under certain circumstances to be described.

The latter cylinder mating structure is that seen in application Ser. No. 812,538 now U.S. Pat. NO. 3,508,470, inventors Swander-Wearden, filed on Mar. 10, 1969, for "Brake Actuator".

The center portion of the outer wall 53 of cylinder portion 50 is preferably dished as at 54 with a central opening 55. A resilient plug 56 is removably received within opening 55 and carries washer 57 of greater outer diameter than the inner diameter of opening 55 thereon.

Received within the inward cylinder portion 42 is a piston generally designated 64 having an outer (radially) peripheral wall 60 of relatively lesser outer diameter surmounted by a wall engaging or abutting portion 61 having circumferential grooves 62 and 63 therein with suitable sealing rings of synthetic rubber, felt or the like. The innermost wall portion of the piston 64 receives the inward end of a power spring 65, the outer end of the power spring abutting the outer wall 53 of the outer portion of the can or cylinder 50.

The central hub 66 has an opening 67 out the upper portion thereof which communicates with the internally threaded portion 68 of piston rod 48. A threaded bolt 69 with an enlarged head is threadably and removably engaged with the said internally threaded portion 68 of piston rod 48.

Bolt 69 cooperates with metal washer 57 in a backoff function cooperating with the threaded portion 68 of piston rod 48 and opening 67. The mechanism of such action is simple and previously disclosed in other patents, consisting of (1) removing plug 56, (2) unscrewing bolt 69, (3) passing bolt 69 through the central opening of washer 57 with the latter lying outside opening 55, (4) threading the end of bolt 69 back into threaded portion 68 through opening 67 and (5) withdrawing piston 59 toward wall 53 by the screw action of the mechanical release. (See U. S. Pat. No. 3,376,623.)

Fixed to the inward end of piston rod 48 by screw 70 is plate 71. Screw 70 is threadably received in an internally threaded plug 72 fixed within the lower hollow end of piston rod 48. Plate 71 operates to abut in force transmitting fashion diaphragm 15.

FIG. 1 OPERATION (OVERALL)

The mode of operation of the device in FIG. 1 is as follows. In the first place, air pressure through passage 29 passes between the diaphrams 15 and 16. This forces push rod 21, via plate 18 and against the action of diaphragm return spring 20 out the inward end of service chamber housing 14 to apply the brake via mechanism connected to the inward end of push rod 21 of conventional type. Likewise, should diaphragm 16 perforate or rupture or there be an emergency brake application, air is input through passage 13 into space 28 above the outward diaphragm whereby to also apply or aid in application of the brake.

During all service and secondary brake applications via the diaphragms 15 and 16 in the brake chamber, air pressure is maintained in chamber 59 between piston 64 and wall 10. Thus, plate 71 and piston rod 48 are in the outward position shown with power spring 65 compressed. Chamber 73 breathes through openings 74 filtered by ring filter 75. Should the air supply into passages 29 and 13 fail or, under certain circumstances, deliberately upon decision of the operator, or in a parking situation, air is exhausted from chamber 59 through the passage (not seen) analogous to the passage 46 of FIG. 4b. Power spring 65, through piston rod 48, plate 71 and via plate 18, as well as push rod 21, applies the brake. The vehicle may not be moved until air pressure is restored into chamber 59 or the mechanical backoff function described is exercised.

The resilience of the power spring 65 permits correction or movement of piston rod 48, plate 71, plate 18 and push rod 21 against return forces and brake drum contraction upon cooling and the like.

BRAKE UNIT OF FIG. 5

Referring to FIG. 5, the portions thereof which are essentially identical to the structure of FIG. 1 will be numbered the same as the parts in that view, but primed. To be more specific, with respect to FIG. 5, essentially the outer half of the figure (the upper half of the drawing or upper smaller half thereof), comprising the double diaphragm chamber, is identical in structure and function to the double diaphragm air brake chamber of FIG. 1 (inboard thereof).

Referring to FIG. 5, in this brake construction, the spring unit is inboard of the double diaphragm brake chamber. A cylindrical can 100 is inwardly formed at the outward end 101 thereof with central inwardly extending portion 102 defining opening 103 centrally thereof. Thus, outer wall portion 101 of cylinder or can 100 serves as a spring retainer for power spring 104. The inward end 105 of can 100 is circumferentially outwardly tapered or flanged and received circumferentially on an inner wall portion (bulkhead) 106. Cylinder portion 105 is fixed at a plurality of points to inner wall 106 by screws or bolts 107. An upwardly standing peripheral flange 108 has, on the outer upper surface thereof, groove 109 with sealing means, such as rubber rings therein. This effects an air seal against the inner surface of the cylindrical wall of the can 100. Centrally of the inner wall 106 is provided opening 110 radially recessed as at 111 to receive therewithin shaft sealing means including O-ring 112a, bushing 112b, and felt lubricating ring 112c located in the latter) retained by ring 113 in groove 114. Studs 115 serve to attach the entire housing assembly to an automotive frame, axle or the like. (The same is true of studs 99 (bolts welded in) in FIG. 1 at the inward side 14 of the service chamber.)

A piston generally designated 116 has an outer greater diameter wall portion 117 containing grooves 118 and 119 with sealing nylon rings or the like. The upper portion of the piston is provided with extensions 120 to act as a stop. Central hub 122 of the piston has a shelf or ledge 123 formed thereon whereby to receive the lower end of brake chamber diaphragm return spring 20'. The inner central portion of the piston fixedly engages a bushing 124 which also is fixed to the outer end of hollow piston rod 125. Push rod 21' extends down centrally through push rod bushing 124 in slidable sealing fashion, within hollow piston rod 125. At the lower end of (inward end of) rod 21', there is a threaded portion 126 upon which a washer 127 is threadably received, same locked thereon by nuts 128 and 129 which adjust the position of washer 127 on rod 21'. The outer diameter of washer 127 is greater than the outer diameter of tube 125.

There is additionally provided an air input passage 130 in the inner wall 106 which passes air into the cavity 131 between piston 116 and inner wall 106.

Referring to the seal system at 112 in FIG. 5, 112a is a rubber O-ring seal. Member 112b is a guide bushing or bearing which takes the load (may be nylon). Element 112c is a saturated oil felt ring. There is a clearance between piston rod 125 and the lower wall at 110 which is of the order of 30 thousandths of an inch. O-ring 112a sits on the outboard bushing ledge and does not require a formed groove.

In previous analogous seal constructions, with the working of a piston rod through an opening like that at 110 with respect to an O-ring, there is typically D-type wear on the O-ring. In cold weather, one thus tends to lose the sealing effect. In his novel seal assembly and construction of FIG. 5, the oil soaked felt 112c provides an oil film on the piston rod 125 which is carried to the O-ring in its reciprocation through the opening 110 whereby to markedly reduce wear. The length of time that a manufacturer can keep the unit (zone 131) leak-free comprises a basic specification. This is markedly improved in this situation.

If one compares the seal at 47 in FIG. 1 with the seal at 112 just described, it may be seen that a less elaborate seal (of relatively conventional type) is employed. In the example of FIG. 1, the novel seal construction of FIG. 5 is not required because one is working between a pair of sealed atmospheres. That is, the atmosphere in zone 59 and that of zone 28 above diaphragm 15 are sealed with respect to the outside and may be operated with filtered air. On the other hand, at 112, the piston rod 125 is working out of a sealed atmosphere (at 131) into the corrosive atmosphere under the truck.

Further with respect to FIG. 5, and referring to housing 100, the structure thereof, per se, should be noted. In the first place, the spring retainer 101 is integral with and part of the cylindrical housing 100. That is, the outward end 101 of the cylinder 100 has centrally inwardly extending portion 102 defining opening 103 centrally thereof, portions 101 and 102 serving as a spring retainer for power spring 104. The inboard portion of the cylinder or can as at 105 is circumferentially outwardly tapered or flanged and received circumferentially on the upwardly standing peripheral flange 108 of inner wall bulkhead 106. The counter tapers of the flange 108 and bulkhead 106 with the seal in groove 109 effects an air seal and greatly aids assembly and disassembly of the inner wall member 106.

FIG. 5 OPERATION

In the operation of the device seen in FIG. 5, air pressure through passage 130 into chamber 131 normally retains the piston 116 in the precise position shown in the view, namely, with extensions 120 rammed against wall member 101, thus totally compressing power spring 104. In the meantime, as air is normally input into fitting 30' through passage 29' in service operation of the brake, inward diaphragm 16' acts upon plate 18' and push rod 21' to actuate and release the brake to a greater or lesser degree. Tube 125 does not move during this normal operation.

In the case of an emergency actuation of the brake or in case the inward diaphragm 16' perforates, air is input into passage 13', thus forcing diaphragm 15' inwardly toward the brake actuating it via plate 18' and 21'.

In the case of loss of pressure in the passages 29' and 13', diaphragm return 20' returns the diaphragm to the position shown. Under certain circumstances, at operator's option, air pressure, however, would simultaneously be lost through passage 130 from chamber 131, thus permitting power spring 104 to drive piston 116 down until the lower portion of piston wall 116 abuts wall 106, thus applying the brake via tube 125 abutting washer 127 and picking up rod 21'. This occurs in a parking situation when pressure goes out of chamber 131.

Thus, it is seen that the operation of the brakes of FIGS. 1 and 5 are the same, but utilizing different mechanisms due to the fact that, in one, FIG. 1, the power spring chamber is outboard of the chamber and, in FIG. 5, the other, the opposite is true.

FIG. 7 CONSTRUCTION

Referring to FIG. 7, aside from an omission (to be described) at the periphery of the diaphragm, and an addition (to be described) with respect to the brake operating rod, the structure of the chamber and the parts thereof of FIG. 7 is substantially identical to that of FIG. 1. Accordingly, like numbers will be employed to indicate like parts between the two Figures, save in the case of FIG. 7, those numbers will be double primed. If there are minor structural variations, the parts will be described.

Referring, then, to FIG. 7, at 10" is generally designated the outboard pressure plate or member of an air brake chamber. This outboard pressure plate also serves as the inboard wall, if desired, for a spring unit. Alternatively, the outboard pressure plate may be integral and serve as a closure wall simply for a vehicle brake chamber. Member 10" has an inboard circumferential flange of 11" adapted to be gripped by a clamp band 12". An air input opening, not seen, is provided to input air into the space 28" between the outer cap and the outboard diaphragm 15".

The inboard plate, member or portion 14" of the air brake chamber has an outboard peripheral flange 14a", the latter also received within clamp band 12" in conjunction with flange 11". The peripheral edges of a pair of standard diaphragms 15" and 16" also are gripped in air sealing fashion circumferentially between flanges 11" and 14a", removably fixed by clamp band 12". Diaphragm 16" is the inboard or normally operating (in service brake applications) diaphragm of the pair. Diaphragm 15" is the outboard (secondary) diaphragm.

Inboard diaphragm 16" abuts, on its inboard or inner face, a circular pad or plate 18". Plate 18" receives diaphragm return spring 20" thereagainst, the latter encircling push rod 21" fixedly mounting plate 18". Rod 21" extends through an opening 22" in the inboard wall of inboard service chamber plate 14", centrally thereof, whereby to pass out of the brake chamber toward the axle or braking member or means. Air exhaust openings 23", covered inboard by filter material 24", are provided spaced around the lower shell 14" of the brake chamber.

The brake chamber has basically three zones. These comprise the inboard zone or space 25" to find between the inboard face of the inboard diaphragm 16" and the inboard or inner wall 26" of service chamber plate or member 14". Zone 25" breathes through openings 23" as the diaphragms, or one of them, move toward and away from the inner face 26" of chamber member 14" in service (or secondary) applications of the brakes and releasings thereof. The second zone of the chamber is that space number 27" between diaphragms 15" and 16" and which is served by an air input (to be described) through rod 21". The third zone of the air brake chamber is numbered 28" and comprises that space outboard of or above (in the view of FIG. 7) the outboard diaphragm 15".

That which has been immediately above described is substantially identical to, at least functionally, the structure of the chamber of FIG. 1, supra. I now turn to the description of those features of this Figure which differ from the chamber illustrated in FIG. 1.

Turning to the zone of clamp band 12", flanges 11" and 14a" and diaphragms 15" and 16" (the peripheries thereof) there is further provided, outboard of all of diaphragms peripheries 15" and 16" and flanges 11" and 14a", a continuous circumferential steel band or ring 200 which has no opening therethrough. The width of ring 200 is greater than the space between the opposing outer faces of flanges 11" and 14a", whereby the peripheries of diaphragm 15" and 16" are continuously maintained at a uniform radius and do not extrude under pressure at the clamp band bolt joints or connection points. Ring 200 lies against the inner face of clamp band 12".

Diaphragm 16" has opening 201 centrally thereof. A centrally dished washer 202 is provided with a central opening therein. A hollow push rod 203 having an outwardly flanged outboard end 204 is removably (threadably) received in an opening 205 through plate 18". Rod 21" has a central passage 206 therewithin with inboard outlet port communicating with circumferential groove 208 which likewise connects with air input passage 209 which is internally threaded in its radially outboard portions. Passage 209 is received within cylindrical block 210 slidably and frictionally fitted on a lesser diameter portion 211 of rod 21". Grooves with O-rings are provided at 212 and 213 in block 210, same sealing against the outer surface of lesser diameter rod portion 211. The inboard end of rod 21" is externally threaded to removably receive locknut 214 and yoke 215 thereon.

Referring then, to the operation of the chamber of the brake in FIG. 7, in ordinary service applications of the brake, air is input through passage 206 via passage 209, groove 208 and openings 207 and numbered 203 to the space 27" between diaphragms 15" and 16". This actuates push rod 21" downwardly in the view of FIG. 7 or toward the observer or inboard toward the brake. The action of this air pressure is two-fold. In the first place, it acts to maintain diaphragm 15" in the position shown in the view and, secondly, it drives diaphragm 16" inboard against the force of return spring 20" to extrude push rod 21" through opening 22" and, through whatever linkage is employed, actuate the brakes. As air pressure rises in the space 27" between the diaphragms, this relationship remains true, namely, diaphragm 15" in the position shown and diaphragm 16" working inwardly (and outwardly — as the pressure falls) to actuate and release the brake to a greater or lesser degree as the vehicle operator applies and releases the brakes.

In the event of rupture or perforation of inboard diaphragm 16", or alternatively, in the event of a secondary or emergency application of the brakes, air pressure is input to the space 28" (via a conventional fitting attached to an air supply hose not shown) whereby to force the outboard diaphragm 15" downwardly in the view of FIG. 7 or toward the viewer or inward to effect actuation of the brakes.

FIG. 6 CONSTRUCTION

The FIG. 6 construction is extremely like, in structure and function, the structure and function of the brake chamber of FIG. 1, as well as the spring brake chamber outboard of the chamber of FIG. 1. Therefore, all of the parts which are essentially the same in structure and function as the parts in FIG. 1 will be numbered the same, but triple primed. These will not be redescribed, as the description of the double primed parts in FIG. 7 are even more closely analogous to the structure involved.

The sole substantial differences between the chamber of FIG. 6 and that of FIG. 1 lies in the provision of that a single diaphragm 300, in the chamber, as well as the showing of the air input opening 301 in number 10''' passing air via passage 302 into the zone 72''' to illustrate this passage structure. There is a passage peripherally and angularly removed from passage 300 to flow pressurization fluid into space 28''' outboard of the single diaphragm 300. There is a single continuous metal band or ring 303, without a passage therethrough, positioned outboard of flanges 11''' and 14a''', as well as the periphery of diaphragm 300 and within clamp band 12''' so as to continuously and peripherally seal the outer rim of the diaphragm against extrusion under pressure. Ring 303 lies against the clamp 12''' on its outer face.

The function of the device of FIG. 6 is simple. In service actuations, with air pressure flowed into space 28''', diaphragm 300 moves downwardly in the view of FIG. 6, thus applying the brakes through plate 18''' and 21'''. When air pressure is released from the space 28''', diaphragm return spring 20''' returns the diaphragm to the position of the view. In the case of operator choice or secondary application of the brakes, or in the case pressure is lost from space 28''' by rupture of diaphragm 300, the spring unit (not seen in FIG. 6, but the same as that of FIG. 1) applies the brakes via push rod 48''' acting through plate 71'''' on plate 18''' and rod 21'''.

FIGS. 8 AND 9

Referring to FIGS. 8 and 9, this improvement relates to the upper portion of FIG. 1, namely, the spring chamber and the mechanical release or backoff therefor. Those parts which are the same as the parts of the spring chamber of FIG. 1 are numbered the same, but primed.

Turning to the unique structure of FIGS. 8 and 9, a resilient plug 200 is removably received within opening 55'. Plug 200 has outwardly protruding body portion 200a with circumferential groove 200b therearound. Removably mounted on the plug 200 is adaptor 201 (so generally designated) having a circular flange 201a at one end thereof, a pair of opposed (180°) notches or slots formed in the edges thereof as at 201b. Centrally of the flange 201a is an opening 201c. This receives the body portion 200a of the resilient member 200. Fixed centrally around opening 201c is cylindrical portion 202, there being provided a shelf 203 within same to permit the outer portion of resilient member 200a to overlie same. Screws or bolts 204 are removably engageable in internally threaded holes 205 which are formed through wall portion 54' immediately outwardly of opening 55' therewithin.

FIG. 8 shows the member 201 in stored position. FIG. 9 shows the member 201 in operating position.

In the latter position, the member 201 is inverted from the position of FIG. 8 and the cylindrical extension 202 thereof extends downwardly within the opening 55'. The internal diameter of the cylindrical extension 202 must be greater than the outer diameter of the threaded portion 68' of the bolt 69'.

The bolts or screws 204 have been unthreaded from internally threaded openings 205 and the resilient member 200 unsnapped from its connection with member 201. The flange 201a lies against the inner dished portion 54' of the outer housing and, being of greater outer diameter than the opening 55' circumferentially overlies the edge thereof. The cylindrical extension 202 of member 201 is of sufficient length that, when the flange 201 is positioned as seen and bolt 69 is used in its backoff function as previously described with respect to FIG. 1, the lower edge of extension 202 will abut against the top of the cylindrical central piston extension 66' before the peripheral portion of the piston skirt 61 abuts against the circumferential stop 51.

Thus the piston 64 will not be fractured by excessive mechanical backoff against the spring 65 because of the positive abutment of central hub 66' against the lower edge of the cylindrical extension 202. This can be of considerable importance because it is not always possible to tell when the peripheral piston abutment has been made and added strain may be placed on the piston or even fracture thereof before the resistance becomes sufficiently great against the backing off action utilizing the bolt whereby to stop same. This device conclusively does away with that problem.

FIG. 11

FIG. 11 shows the simple end connection of the ends of an elongate strip usable as a diaphragm retainer ring generally designated 400 and having free ends 401 and 402. When ends 401 and 402 are spot welded to one another as at 403, there is formed a continuous ring or band which is usable, for example, in the constructions of FIGS. 6 and 7 as at 303 (FIG. 6) or 200 (FIG. 7).

FIGS. 12 AND 13

FIG. 12 shows a plan view of a diaphragm spacer such as 17 in FIG. 1 utilized with the removable hook-ended band of FIG. 4a. It should be noted that nipple 30 is preferably provided with horizontal side flanges 30a and 30b over which hook ends 303 and 304 may engage.

FIG. 13 shows the utilization of band 310 of FIG. 10 with diaphragm spacer 17. In this case, the enlarged central openings 311 and 312 fit over nipple 30 with slotted ends 311a and b and 312a and b removably engaging flanges 30a and 30b.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In an air brake chamber wherein a diaphragm is peripherally engaged by opposed flanges of paired housing members defining the brake chamber therebetween, a pressurized fluid input into said chamber between said diaphragm and one of said housing members, the flanges of said housing members, with the diaphragm engaged therebetween, removably and substantially circumferentially gripped by a clamp band, the improvement which comprises an encircling diaphragm retaining ring of a width at least equal to the thickness of the diaphragm (when the latter is compressed between said two flanges) positioned outboard of the diaphragm periphery and inboard of the clamp band.

2. An improvement as in claim 1 wherein said ring is a continuous band.

3. In an air brake chamber wherein a pair of diaphragms are peripherally engaged by opposed flanges of paired housing members defining said brake chamber therebetween, a pressurized fluid input into said chamber is provided between one diaphragm and one of said housing members, the flanges of said housing members, together with the peripheries of the diaphragms engaged therebetween, removably and substantially circumferentially gripped by a clamp band, the improvement which comprises a diaphragm retaining ring encircling the peripheries of said diaphragms, said ring of width at least equal to the thickness of the two diaphragms when the latter are clamped between said flanges, said ring positioned inboard of the clamp band and outboard of the said diaphragms and flanges.

4. An improvement as in claim 3 wherein said ring is a continuous band.

5. An improvement as in claim 3 wherein the outboard one (with respect to the brake) of said housing members has an inwardly extending bead positioned centrally of the inboard surface thereof, said bead continuous and operative to form, when the outboard diaphragm is positioned thereagainst, an annular zone between the periphery of the outboard diaphragm and the bead adapted for pressure sensing.

6. In an air brake chamber wherein paired diaphragms are peripherally engaged, with a first spacing ring therebetween, by opposed flanges of paired housing members defining said brake chamber therebetween; a first pressurized fluid input is provided into said chamber between the outboard (with respect to the brake) diaphragm and one of said housing members and a second pressurized fluid input into said chamber is provided between the two said diaphragms; the flanges of the said housing members having the peripheries of the diaphragms engaged therebetween with the said first ring spacing them; all of said flanges, diaphragms and first ring removably and substantially circumferentially gripped by a clamp band, the improvement which comprises a second diaphragm retaining ring encircling said diaphragms and first spacing ring, the width of said second ring at least equal to the combined thickness of the two diaphragms, in clamped state, with the first ring clamped therebetween, and said second ring positioned inboard of the clamp band and outboard of the diaphragm peripheries, first ring therebetween and flanges.

7. An improvement as in claim 6 wherein said second ring comprises an elongate nOn-continuous band having a notch in each elongate edge thereof near each one of the ends thereof, said notches opposed to one another. (facing out of opposite edges)

8. An improvement as in claim 6 wherein an inwardly (with respect to said brake) extending continuous bead is provided on the inboard internal surface of the outboard one of said paired housing members, said bead operative, when said outboard diaphragm is positioned thereagainst, to provide an annular pressure sensing zone between the periphery of the diaphragm and said bead.

9. An improvement as in claim 6 wherein said second ring is a non-continuous band, said band having a pair of perforations therein adjacent the ends thereof, each of said perforations having a slot connecting therewith extending toward the end of said band to which said perforation is most adjacent.

* * * * *